Dec. 16, 1947.  E. O. CARPENTER  2,432,723
TRAP
Filed Sept. 17, 1945
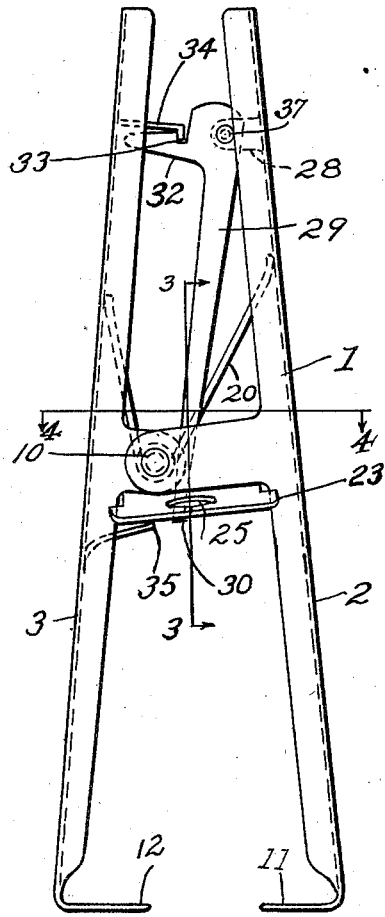
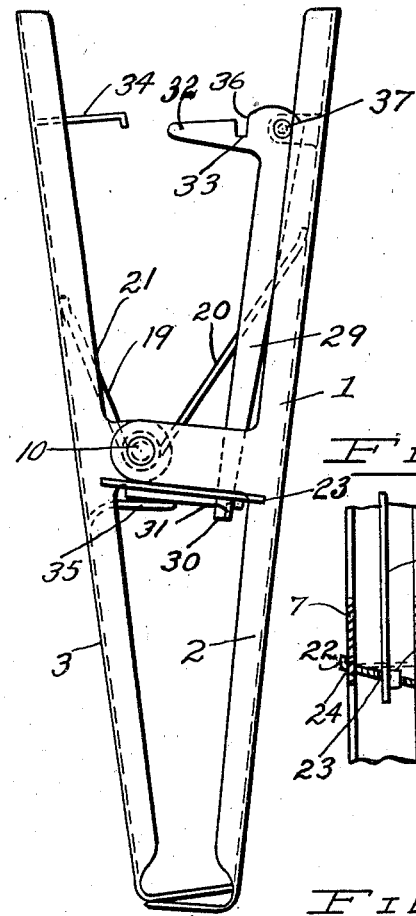
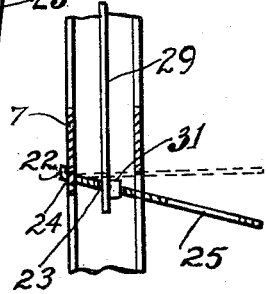
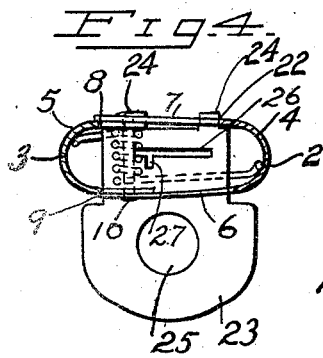
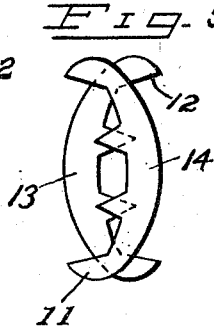
INVENTOR.
EDGAR O. CARPENTER,
BY
ATTORNEY.

Patented Dec. 16, 1947

2,432,723

UNITED STATES PATENT OFFICE 2,432,723

TRAP

Edgar O. Carpenter, Van Nuys, Calif.

Application September 17, 1945, Serial No. 616,748

5 Claims. (Cl. 43—88)

1

The present invention relates to traps of the type adapted to catch, hold and kill small animals. Specifically, the trap is so constituted and arranged as to readily capture gophers, rats, mice and other rodents, as well as such animals as foxes, wolves and coyotes.

The invention has for an object the provision of a trap which utilizes few parts, may be readily set without endangering the operator, is foolproof in operation, positive in its action and superior to traps now known to the inventor.

The average trap has many parts, which are difficult to manufacture and assemble. The present trap may be stamped from metal and assembled in a minimum of time, at small cost.

An object of the invention is to provide a trap wherein the tripping mechanism is so arranged as to allow a ready setting of the trap when the trap is held in one position, and an equally ready releasing of the trap when held in a second position. The foregoing object is accomplished without the use of auxiliary springs such as are ordinarily provided in the average trap.

A further object of the invention is the provision of a trap which may be placed in various positions, a feature of importance, for the reason that the average trap, particularly of the mouse or rat type, must be laid flat. The present invention allows the trap to be positioned adjacent a rat hole so that the rat upon emerging from said hole will snap the trap irrespective of whether the bait is contacted or eaten.

Another object of the invention is the provision of a trap construction which will permit the operator to place the trap in unset condition within a burrow and thereafter set the trap, and when the animal is caught will permit ready release of the trap to dislodge the animal without the operator needing to touch the animal.

With the above mentioned and other objects in view, the invention consists in the novel and useful provision, formation, construction, association and relative arrangement of parts, members and features, all as shown in a certain embodiment in the accompanying drawing, described generally and more particularly pointed out in the claims.

In the drawing:

Fig. 1 is a side elevation of the invention showing the trap in set position;

Fig. 2 is a view similar to Fig. 1, the trap being sprung;

Fig. 3 is a fragmentary view, partly in section and taken substantially on the line 3—3 of Fig. 1;

Fig. 4 is a sectional view on the line 4—4 of

2

Fig. 1, and looking in the direction of the arrows;

Fig. 5 is a diagrammatic view of the jaw members, looking in the direction of the arrow 5 of Fig. 2; and Fig. 6 is a diagrammatic view of the jaws in open position.

Referring now with particularity to the drawing:

The improved trap is designated as an entirety and in one embodiment by the numeral 1, and the same includes a pair of arms 2 and 3, adapted to be hinged together at some point intermediate the lengths of said arms. Specifically, the arms are channelled in cross section, as shown in Fig. 4, at 4 and 5, and the arm 2 is provided with a pair of spaced substantially parallel leaves 6 and 7, which may be formed integrally with the sides bounding the channel, while the arm 3 is similarly provided with two substantially parallel leaves 8 and 9. The leaves 6, 7, 8 and 9 are transversely bored to receive a pin 10 for holding the two arms in hinged relationship.

The arms terminate at one end in jaw portions 11 and 12, the jaw portions extending transversely of the said arms and being formed as shown in Figs. 5 and 6. The said jaws include base portions 13 and 14, the facing edges of which are both provided with impaling portions or barbs 15. The inner bounding edge of each base portion is curved, as shown at 16, so as to conform to the curvature of the rodent's burrow when the trap is set. When the trap is sprung, as hereinafter set forth, the base portions overlap, see Figs. 2 and 5, the base portion 13 overlying the base portion 14. Both ends of the two jaws curve inwardly, as indicated at 17 and 18, to substantially encompass the animal and hold it tightly.

For the purpose of resiliently moving the arms I have provided a spring 19. This spring is coiled about the pin 10, with one end 20 of the spring received in the channel portion of arm 2, while the opposite end 21 is positioned in the channel of arm 3.

To control the closing movement of the arms under action of the spring, a tripping arrangement is provided. The leaf 7 is of greater depth than leaf 6, and is provided with one or more transverse slots 22. A trip plate 23 is provided with one or more edge lugs 24 for passage through said slots 22, the lugs being inturned so as to prevent escape thereof from the leaf. This construction provides a hinge which permits tilting movement of the plate, as indicated in the full and dotted line positions therefor in Fig. 3. Said plate as shown in the figures lies beneath the leaves 6, 7, 8 and 9. The plate is of varying tranverse width, the greatest width being outward from the leaves, to provide a table portion formed with a transverse bore 25 upon and within which bait may be placed. The plate 23 is provided with an elongated transversely positioned slot 26, and with a short-length slot 27 communicating with slot 26 and at right angles thereto.

The arm 2 is provided with a lug 28 to which is pinned one end of a trigger 29. This trigger constitutes an elongated arm, one end 30 of which is provided with an edge flange 31 at right angles to the plane of the arm. The arm is passed through the slot 26 so that the flange portion 31 lies beneath the plate 23, see Fig. 2. When the flange 31 is beneath the said plate, the plate is held in raised position, as shown in Fig. 2; and when the jaws are set, as shown in Fig. 1, the flange 31 is positioned within the slot 27 of the plate, and the plate is in the full line position shown in Fig. 3. The trigger arm is provided with a nose portion 32 extending outwardly from one edge of the arm toward the arm 3, and said nose portion is provided with a transverse notch 33. Arm 3 is formed with a catch 34, constituting an angular-ended tongue, adapted for cooperation with the nose portion and specifically with the notch 33 thereof, as illustrated in Fig. 1.

The construction of the present trap is such that the flange 31 of the trigger will not enter the slot 27 until the catch 34 is ready to engage the groove 33. Thus the trap is foolproof in its operation. If, for instance, the trigger arm should swing in the slot 26 sufficiently to be received within the slot 27, the catch might not engage the groove 33, and hence the trap would not be set. In the present instance, the angular end of the catch will engage the top surface of the nose 32 until said angular end strikes the wall 36. As the catch engages wall 36 above the pivot point 37 for said trigger arm, the trigger arm is revolved so as to move the arm within the slot 26 and toward the slot 27. At the time that the flange 31 on said trigger arm reaches the slot 27, the angular end of the catch is moved within the slot 33.

The operation, uses and advantages of the invention are as follows:

Assuming the arms of the trap in the position shown in Fig. 2, the operator may place bait on the plate 23 by passing the bait partly through the bore 25. The operator then grasps the upper ends of the arms with the fingers and closes the arms to the position shown in Fig. 1, which movement separates the jaws 11 and 12. The latch arrangement, constituting the catch 34 and the nose portion 32, then cooperate in such a manner as to swing the trigger 29 from the position of Fig. 2 to that of Fig. 1, whereby the flange 31 is positioned in the slot 27, as shown in Fig. 3. The plate 23 is then in the full line position of Fig. 3, for the reason that the upper edge of the flange 31 will hold the plate in an upward position until the slot 27 is reached, whereupon the plate drops under the action of gravity. The trigger 29 will automatically swing to the position shown in Fig. 1, without the use of any auxiliary springs or the like, due to engagement of the extended nose portion 32 with the catch 34. A tongue 35 carried by arm 3 beneath plate 23, acts to limit movement of the trigger arm in one direction, and likewise serves to protect the plate against damage in the zone of the slots, due to trigger movement. When the animal to be trapped engages the bait holding plate 23 to tip the same upwardly from the full line position of Fig. 3 to the dotted line position thereof, the flange 31 is moved from the full line position of Fig. 3 to a position beneath the plate. The moment this position is reached the trigger arm may move within the elongated slot 26, thereby unlatching the catch from the groove 33 of the nose portion 32. Under urgency of the spring 19 the jaws 11 and 12 approach and entrap the animal therebetween. Whether the animal is killed or simply held will of course depend upon the strength of the spring.

In trapping gophers, the trap is placed so that the jaw members are adjacent the entrance to the gopher burrow. In the case of other rodents, such as rats or mice, the bait holding plate 23 is usually surrounded by a casing or shield of some form whereby the rodent is prevented from having direct access to the bait without first entering between the separated jaws 11 and 12.

Furthermore, the trap does not always have to be baited. In the case of gophers the intention is that the gopher will crawl between the jaws and strike the plate 23, tipping it to release the jaws and impale the gopher around the neck or in the region of the heart. The operator does not set the trap prior to pushing the same into the gopher hole. In other words, the trap would be in the position shown in Fig. 2, and the jaws would be put into the gopher hole and thereafter the arms would be moved together to set the trap. When a gopher is caught the operator merely moves the handles together and shakes the trap, which will dislodge the animal from the jaws.

All parts of this trap may be stamped, as for instance, the catch constitutes a punching from the arm 3, as does likewise the tongue 35. The same is true for the lug 28 on arm 2. Thus manufacturing costs are reduced and the assembly of the trap is easy of accomplishment by unskilled labor.

I claim:

1. A trap as disclosed, including a pair of arms intermediately hinged together, both arms provided at one end with jaw portions, a trip plate positioned between the said arms, a trigger arm swingingly mounted on one of the jaw arms, a catch carried by the other jaw arm for cooperation with the trigger arm to hold the trigger arm in one position, said trigger arm formed with a part for engagement with said trip plate when the jaws are separated.

2. A trap as disclosed, including a pair of jaw arms intermediately hinged together, a trip plate positioned between said arms and formed with two interconnecting angularly related slots, a trigger arm carried by one of the jaw arms and provided with a flanged end, said trigger arm adapted to be passed through the slots of said plate to position the flanged end either in one of the slots to permit the trip plate to assume one position, or to be positioned beneath the said plate to hold the said plate in a second position, and latch means for the trigger arm for holding the flanged end of said arm in one of said slots, the jaws being separated.

3. A trap, including a pair of arms both formed at one end with a jaw portion, means for hingedly securing the arms together, a trip plate positioned between said arms, a trigger arm cooperating with the trip plate, and latch means between the trigger arm and the jaw arms, whereby the jaws of the arms are held separated when the trip plate is in one position, and when the trip plate is in a second position, the said trigger arm is enabled to move to release said latch to permit the jaws to close, and resilient means for urging the jaws together when the trigger arm is released.

4. A trap as disclosed, including a pair of arms intermediately hinged together and both provided at one end with jaw portions, a trip plate transversely positioned between said arms and movably secured thereto, said plate being provided with two intercommunicating slots in substantially right angular relationship, a trigger arm swingingly mounted on one of the jaw arms, and latch means between the trigger arm and the other jaw arm to hold the jaws of said arms separated, said trigger arm being formed at one end with a flange, said trigger arm being passed through one of the slots of said plate to position the flange beneath the said plate to maintain the plate in one position, said flange being positioned in the other of said slots when the arms are latched together, to maintain the jaws separated.

5. A trap as disclosed, including a pair of arms provided with jaw ends, both arms being intermediately provided with leaves and means for hinging said leaves together, spring means for normally urging the jaws together, a trip plate movably carried by one of the leaves, whereby the said plate may be raised or lowered, said plate being formed with an elongated slot and with an interconnecting transverse slot, a trigger arm swingingly carried by one of the jaw arms and provided at one end with a flange, said trigger arm being adapted to be passed through the elongated slot of the plate to position the flange thereof beneath the plate, and latch means whereby the jaws are held separated, the flange of said trigger arm being positioned within the transverse slot of the plate, whereby the plate is permitted to drop; movement of the plate in one direction permitting the flange of the trigger arm to be positioned beneath the plate for movement of said arm within the elongated slot and release of the latch, permitting the jaws to close under spring action.

EDGAR O. CARPENTER.

REFERENCES CITED

The following references are of record in the file of this patent:

UNITED STATES PATENTS

| Number | Name | Date |
| --- | --- | --- |
| 1,729,976 | Wyman | Oct. 1, 1929 |
| 1,038,672 | Sprague | Sept. 17, 1912 |